(12) United States Patent
Kim et al.

(10) Patent No.: US 10,186,702 B2
(45) Date of Patent: *Jan. 22, 2019

(54) RECHARGEABLE BATTERY

(71) Applicant: SAMSUNG SDI CO., LTD., Yongin-si, Gyeonggi-do (KR)

(72) Inventors: Hyun-Chul Kim, Yongin-si (KR); Hyun Soh, Yongin-si (KR); Sang-Won Byun, Yongin-si (KR); Won-Jun Lee, Yongin-si (KR); In Kim, Yongin-si (KR)

(73) Assignee: Samsung SDI Co., Ltd., Yongin-Si, Gyeonggi-do (KR)

( * ) Notice: Subject to any disclaimer, the term of this patent is extended or adjusted under 35 U.S.C. 154(b) by 159 days.

This patent is subject to a terminal disclaimer.

(21) Appl. No.: 15/207,633

(22) Filed: Jul. 12, 2016

(65) Prior Publication Data
US 2017/0018814 A1    Jan. 19, 2017

(30) Foreign Application Priority Data
Jul. 14, 2015   (KR) .................. 10-2015-0099933

(51) Int. Cl.
| | |
|---|---|
| *H01M 2/30* | (2006.01) |
| *H01M 2/06* | (2006.01) |
| *H01M 2/04* | (2006.01) |
| *H01M 2/26* | (2006.01) |
| *H01M 10/0525* | (2010.01) |

(52) U.S. Cl.
CPC ........... *H01M 2/30* (2013.01); *H01M 2/0482* (2013.01); *H01M 2/0486* (2013.01); *H01M 2/06* (2013.01); *H01M 2/26* (2013.01); *H01M 10/0525* (2013.01)

(58) Field of Classification Search
None
See application file for complete search history.

(56) References Cited

U.S. PATENT DOCUMENTS

| | | | |
|---|---|---|---|
| 9,761,859 B2 * | 9/2017 | Kim ..................... | H01M 2/34 |
| 2012/0141845 A1 | 6/2012 | Byun et al. | |
| 2015/0099163 A1 * | 4/2015 | Kim ..................... | H01M 2/0473 |
| | | | 429/178 |

FOREIGN PATENT DOCUMENTS

| | | |
|---|---|---|
| JP | 2005-108583 A | 4/2005 |
| JP | 2013-171728 A | 9/2013 |
| KR | 10-1244738 B1 | 3/2013 |
| KR | 10-1274914 B1 | 6/2013 |
| KR | 10-2013-0102882 A | 9/2013 |
| KR | 10-2013-0137280 A | 12/2013 |

* cited by examiner

*Primary Examiner* — Carmen V Lyles-Irving
(74) *Attorney, Agent, or Firm* — Lee & Morse, P.C.

(57) ABSTRACT

A rechargeable battery includes a terminal, a connector, and an insulator. The terminal protrudes from a cap plate and electrically connected to an electrode. The connector is between the first terminal and the cap plate and includes a hole for the terminal. The insulator overlaps a first area of a top surface of the connector and a first area of a bottom surface of the connector, and does not overlap a second area of the top surface of the connector and a second area of the bottom surface of the connector.

18 Claims, 12 Drawing Sheets

RECHARGEABLE BATTERY

CROSS-REFERENCE TO RELATED APPLICATION

Korean Patent Application No. 10-2015-0099933, filed on Jul. 14, 2015, and entitled, "Rechargeable Battery," is incorporated by reference herein in its entirety.

BACKGROUND

1. Field

One or more embodiments described herein relate to a rechargeable battery.

2. Description of the Related Art

A rechargeable battery can be repeatedly charged and discharged. Low-capacity rechargeable batteries are used in portable electronic devices such as mobile phones, notebook computers, and camcorders. High-capacity rechargeable batteries are used as power sources for hybrid vehicle motors. When an over-discharge or overcharge condition occurs in a rechargeable battery having a metal case, ignition may occur as a result of high current that is momentarily generated.

SUMMARY

In accordance with one or more embodiments, a rechargeable battery includes a case; an electrode assembly in the case and including a first electrode and a second electrode; and a cap assembly including: a cap plate covering an opening of the case; a first terminal protruding from the cap plate and electrically connected to the first electrode; a connector including a conductive material and a through-hole for the first terminal, the connector between the first terminal and the cap plate; and an insulator including a non-conductive material, the insulator overlapping a first area of a top surface of the connector and a first area of a bottom surface of the connector and not overlapping a second area of the top surface of the connector and a second area of the bottom surface of the connector.

The insulator may include a first insulating layer overlapping the first area of the top surface of the connector, and a second insulating layer overlapping the first area of the bottom surface of the connector. The first portion may have a thickness substantially equal to a thickness of the first insulating layer, and the second portion may have a thickness substantially equal to a thickness of the second insulating layer. The second areas of the top and bottom surface of the connector may not overlap one another. The second areas of the top and bottom surfaces of the connector may be located at respective ends of the connector.

The connector may include a first portion extending from the second area of the top surface of the connector, and a second portion extending from the second area of the bottom surface of the connector. The conductive material may include aluminum or an alloy of aluminum. The non-conductive material may include a non-conductive polymer.

In accordance with one or more other embodiments, a rechargeable battery includes a case; an electrode assembly in the case and including a first electrode and a second electrode; and a cap assembly including: a cap plate covering an opening of the case; a first terminal protruding from the cap plate and electrically connected to the first electrode, and a connector including a conductive material, a through-hole for the first terminal, a body between the first terminal and the cap plate, first portions respectively extending from top and bottom surfaces at a first edge of the body, and second portions respectively extending from the top and bottom surfaces at a second edge of the body.

The rechargeable battery may include a first insulating layer overlapping a top surface of one of the first portions and a second insulating layer overlapping a bottom surface of one of the second portions. Each of the first and second insulating layers may include a non-conductive polymer. An upper side of one or more of the first portions may have a smaller width than that of a lower side of the one or more of the first portions, and a lower side of one or more of the second portions may have a smaller width than that of an upper side of the one or more of the second portions. The conductive material may include aluminum or an alloy of aluminum.

In accordance with one or more other embodiments, an apparatus for a rechargeable battery includes a connector having a first surface, a second surface, and a terminal hole; a first insulation layer overlapping a first area of the first surface; and a second insulation layer overlapping a first area of the second surface, wherein the first insulation layer does not overlap a second area of the first surface and the second insulation layer does not overlap a second area of the second surface, and wherein the second areas of the first and second surfaces do not overlap. The first surface may be substantially flat and the second surface may be substantially flat.

The first insulation layer may overlap an edge of the first surface, the second insulation layer may overlap an edge of the second surface, and the edge of the first surface may oppose the edge of the second surface. The first surface may be uneven, and the second surface may be uneven. A top surface of the first insulation layer may be substantially even with a top surface of the second area of the first surface, and a top surface of the second insulation layer may be substantially even with a top surface of the second area of the second surface.

BRIEF DESCRIPTION OF THE DRAWINGS

Features will become apparent to those of skill in the art by describing in detail exemplary embodiments with reference to the attached drawings in which.

DETAILED DESCRIPTION

Example embodiments are described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art. The embodiments may be combined to form additional embodiments.

It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

When an element is referred to as being "connected" or "coupled" to another element, it can be directly connected or coupled to the another element or be indirectly connected or coupled to the another element with one or more intervening elements interposed therebetween. In addition, when an element is referred to as "including" a component, this indicates that the element may further include another component instead of excluding another component unless there is different disclosure.

Herein, the terms "connector," "connecting member," and "connection member" are used interchangeably to refer to the features identified in this specification by reference characters 58, 158, 258, and 358.

Figure 1:
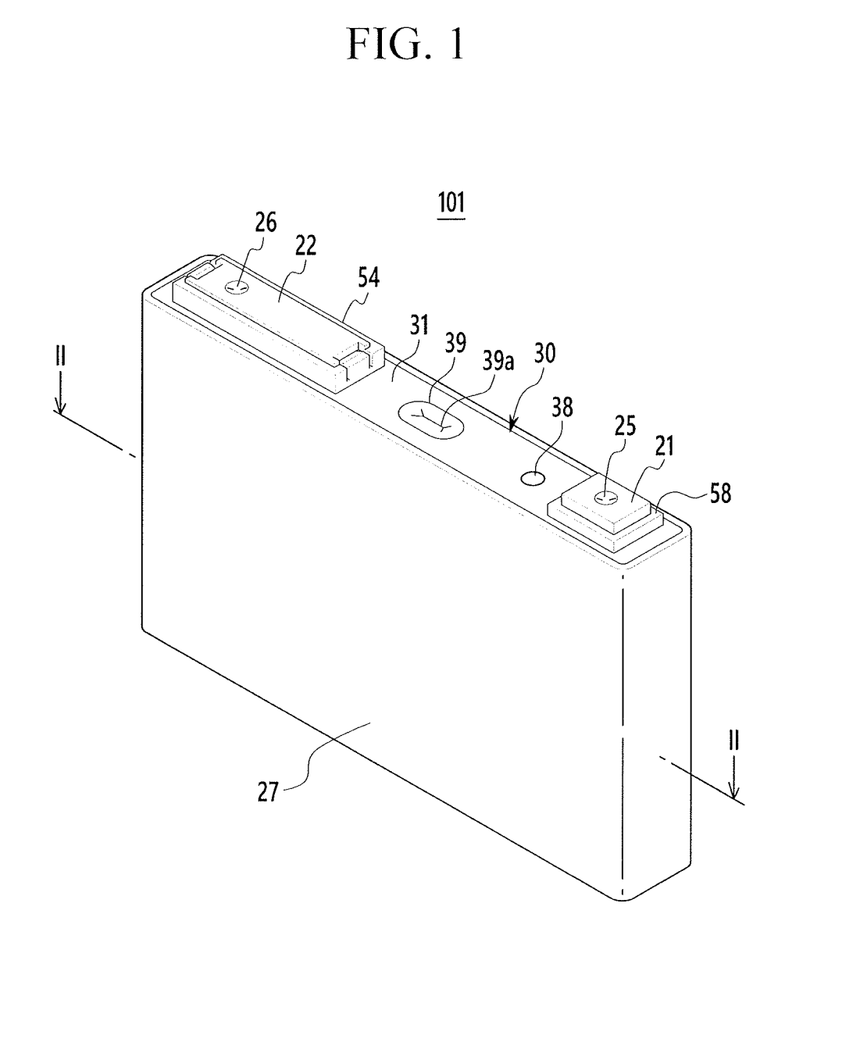
FIG. 1 illustrates an embodiment of a rechargeable battery.
Figure 2:
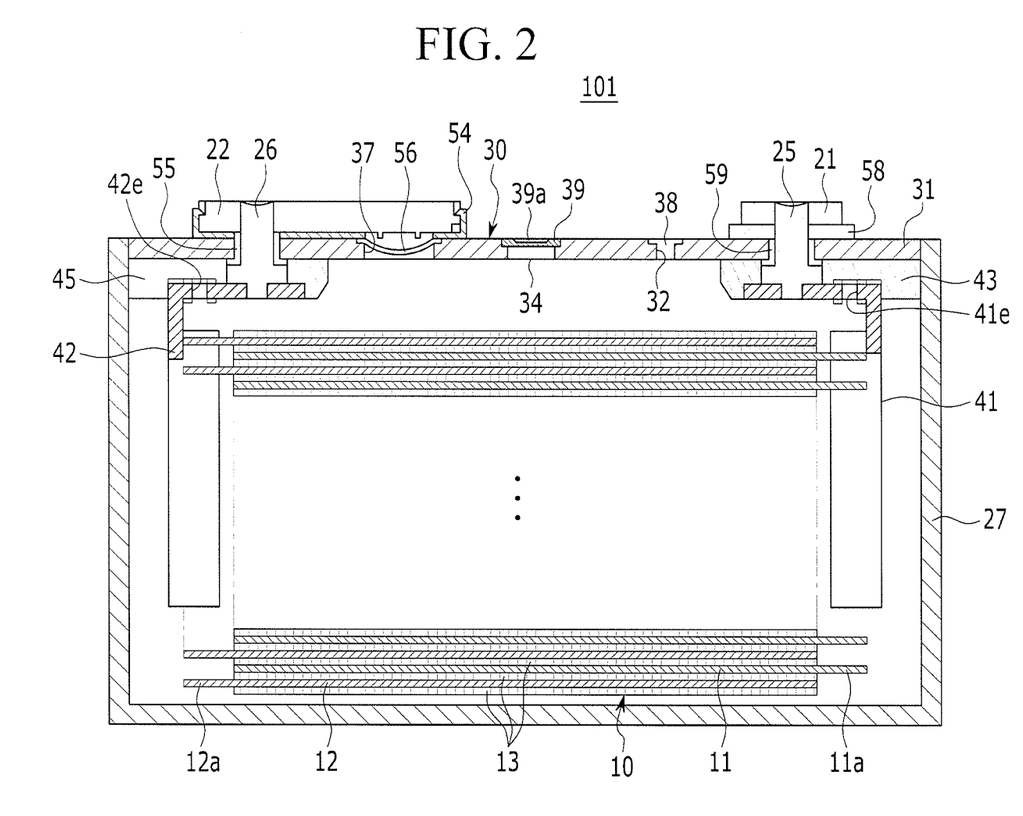
FIG. 2 illustrates a view along section line II-II in FIG. 1.

FIG. 1 illustrates an embodiment of a rechargeable battery 101, and FIG. 2 illustrates a cross-sectional view of the rechargeable battery 101 taken along line II-II in FIG. 1. Referring to FIGS. 1 and 2, the rechargeable battery 101 includes an electrode assembly 10 spirally wound with a separator 13 between a first electrode 11 and a second electrode 12, a case 27 for receiving the electrode assembly 10 and including an open side, and a cap assembly 30 for covering the open side of the case 27. The rechargeable battery 101 may be, for example, a square-type lithium ion secondary battery, a lithium polymer battery, a cylindrical battery, or another type of battery.

The first electrode 11 may be, for example, a positive electrode and the second electrode 12 may be a negative electrode. The positive electrode 11 and the negative electrode 12 include a coated region and uncoated regions 11a and 12a. The coated region may be formed, for example, by applying an active material to a current collector, that is formed with a metal foil in a thin plate shape. The uncoated regions 11a and 12a does not include the active material. The positive uncoated region 11a is formed at one end of the positive electrode 11 in a length direction of the positive electrode 11. The negative uncoated region 12a is formed at another end of the negative electrode 12 in a length direction of the negative electrode 12. The positive electrode 11 and the negative electrode 12 are spirally wound, with separator 13 serving as an insulator therebetween.

In another embodiment, the electrode assembly 10 may be configured by stacking the positive electrode and the negative electrode with a plurality of sheets and a separator therebetween.

The case 27 may have a substantially cuboidal shape and an opening on one side. The case 27 may be made of a metal such as aluminum or stainless steel.

The cap assembly 30 includes a cap plate 31, a first terminal 21, a connecting member 58, and an insulating member 70. The cap plate 31 covers the opening of the case 27 and may be formed, for example, of a thin plate extending in one direction. A seal stopper 38 may be installed in an electrolyte injection opening 32 of the cap plate 31, and a vent plate 39 having a notch 39a adapted to fracture at a threshold pressure may be installed in a vent hole 34.

The first terminal 21 and a second terminal 22 may protrude through and/or from an upper portion of the cap plate 31. For example, the first terminal 21 may protrude outside the cap plate 31 and is electrically connected to the first electrode. The first terminal 21 is electrically connected to the positive electrode 11 with a first current collecting member 41 as a medium. The second terminal 22 is electrically connected to the negative electrode 12 with a second current collecting member 42 as a medium. In another embodiment, the first terminal 21 may be electrically connected to the negative electrode and the second terminal 22 may be electrically connected to the positive electrode.

The first terminal 21 may be a rectangular plate. The first terminal 21 is electrically connected to the positive electrode 11, with a connecting terminal 25 bonded to the first current collecting member 41 as a medium. The connecting terminal 25 may have a pillar shape, and an upper portion of the connecting terminal 25 may be fixed to the first terminal 21 (e.g., through welding) while inserted into the first terminal 21. The upper portion of the connecting terminal 25 may be fixed to the first current collecting member 41 (e.g., through welding), and the first current collecting member 41 is electrically connected to the connecting terminal 25 and the first electrode 11.

A sealing gasket 59 is inserted into a hole through which a terminal passes between the first terminal 21 and the cap plate 31. Lower insulating members 43 are installed below the cap plate 31 for supporting the first current collecting member 41.

Referring to FIG. 2, in one embodiment, the cap assembly 30 may include the second terminal 22 electrically connected to the negative electrode. The second terminal 22 may be a rectangular plate. The second terminal 22 is electrically connected to the negative electrode 12, with a connecting terminal 26 bonded to the second current collecting member 42 as a medium. The connecting terminal 26 extends from and/or passes through the cap plate 31 and the second terminal 22, and has an upper portion fixed to the second terminal 22.

The connecting terminal 26 may have a pillar shape. An upper portion of the connecting terminal 26 may be fixed to the second terminal 22 (e.g., through welding) while inserted into the second terminal 22. The upper portion of the connecting terminal 26 may be fixed to the second current collecting member 42 (e.g., through welding), and the second current collecting member 42 is electrically connected to the connecting terminal 26 and the second electrode 12.

A sealing gasket 55 is inserted into a hole through which a terminal passes between the second terminal 22 and the cap plate 31. A lower insulating member 45 is installed below the cap plate 31 for insulating the second terminal 22 and the second current collecting member 42 on the cap plate 31.

A short-circuit protrusion that protrudes toward a short-circuit hole 37 is formed on a lower portion of the second terminal 22. The second terminal 22 extends in one direction to cover the short-circuit hole 37. An upper insulating member 54 is installed between the second terminal 22 and the cap plate 31 for electrically insulating the second terminal 22 and the cap plate 31.

The cap assembly 30 includes a short-circuit member 56 for short-circuiting the positive electrode 11 and the negative electrode 12. The short-circuit member 56 is electrically connected to the cap plate 31, and is transformed and connected to the second terminal 22 when an internal pressure of the rechargeable battery 101 increases.

The short-circuit hole 37 is formed in the cap plate 31. The short-circuit member 56 is between the upper insulating member 54 and the cap plate 31 in the short-circuit hole 37. The second terminal 22 covers the short-circuit hole 37 on an upper portion of the short-circuit hole 37. The short-circuit member 56 includes a curve that may be bent, for example, as a convex arc in a downward direction. The short-circuit member 56 also includes an edge outside the curve and fixed to the cap plate 31.

The connection member 58 includes a conductive material (e.g., aluminum, or alloys including aluminum) and includes a through-hole 58a through which the first terminal 21 passes. The connection member 58 is between the first terminal 21 and the cap plate 31 and electrically connects the first terminal 21 and the cap plate 31. Accordingly, the cap plate 31 and the case 27 are charged as the positive electrode.

The insulating member 70 covers at least part of a top surface and a bottom surface of the connecting member 58. However, the insulating member 70 may allow part of the top surface and the bottom surface of the connecting member 58 to be exposed.

For example, the insulating member 70 does not cover the whole top surface and bottom surface of the connecting member 58. The insulating member 70 includes an insulating material, e.g., the insulating member 70 may be or include an insulating tape. In another embodiment, the insulating member 70 may be manufactured by coating an insulating material on the top and bottom surfaces of the connecting member 58 and curing the same. In another embodiment, the insulating member may include a non-conductive polymer, e.g., Teflon or another material that does not conduct electricity.

Figure 3:
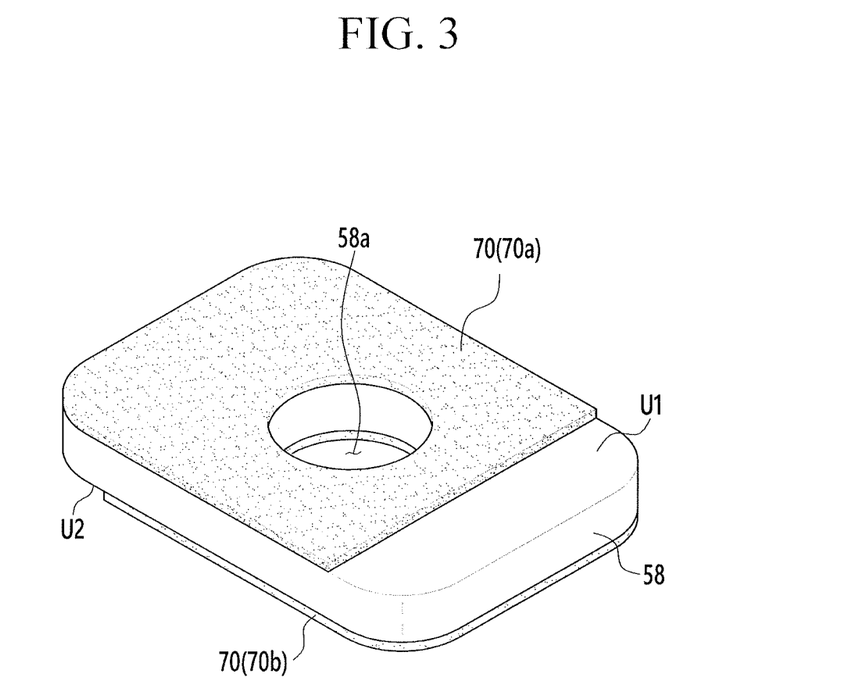
FIG. 3 illustrates an embodiment of a connection member.
Figure 4:
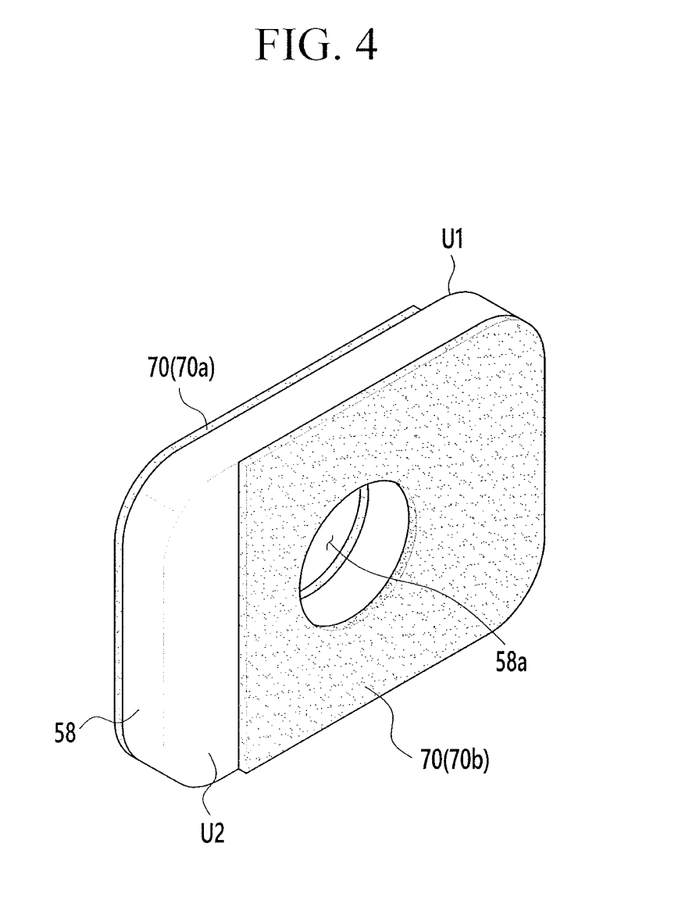
FIG. 4 illustrates another view of the connection member.
Figure 5:
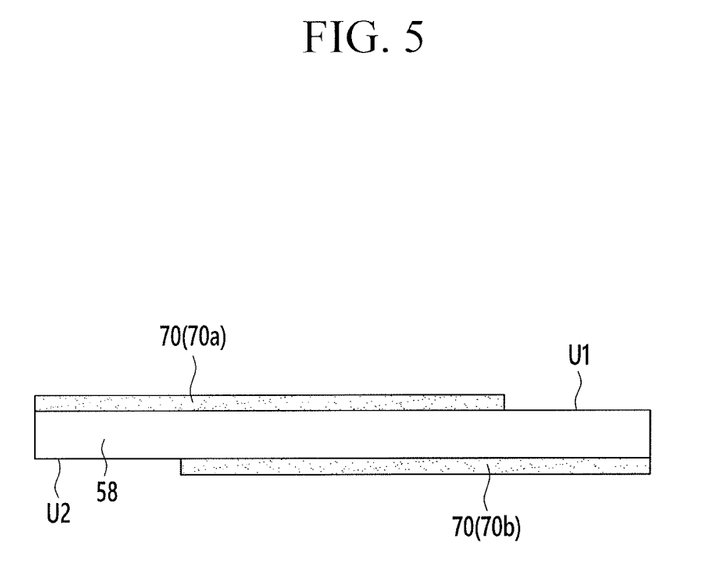
FIG. 5 illustrates another view of the connection member.

FIG. 3 illustrates an embodiment of the connection member 58. FIG. 4 is a perspective view of the connection member 58 in FIG. 3 from a lower direction. FIG. 5 is a lateral view of the connection member 58 in FIG. 3.

Referring to FIGS. 3 to 5, the insulating member 70 includes, for example, a first insulating layer 70a and a second insulating layer 70b. The first insulating layer 70a covers the part of the top surface of the connection member 58. The second insulating layer 70b covers the part of the bottom surface of the connection member 58.

A first exposed side U1, which does not include the first insulating layer 70a, is on part of the top surface of the connecting member 58. A second exposed side U2, which does not include the second insulating layer 70b, is on part of the bottom surface of the connecting member 58. The first exposed side U1 and the second exposed side U2 are in opposite directions with reference to the through-hole 58a and are positions that do not correspond to one another, e.g., at positions that do not overlap.

In one embodiment, the first exposed side U1 and the second exposed side U2 may be located at different ends or edges of the connection member 58. For example, the first exposed side U1 may be at a right region on the top surface of the connecting member 58, and the second exposed side U2 may be at a left region on the bottom surface of the connecting member 58.

When electricity is applied to the connection member 58 of the rechargeable battery 101 (referring for example, to FIG. 2), current flows into the first exposed surface U1 and the second exposed surface U2. The surfaces U1 and U2 do not vertically overlap. Accordingly, compared to a connection member which does not have the first exposed surface U1 and the second exposed surface U2, the current path is increased which, in turn, causes resistance to be increased. This increase in resistance may reduce high current applied to the first electrode 11 during an over-discharge or overcharge condition. The reduction in high current may prevent ignition from occurring in the rechargeable battery.

Figure 6:
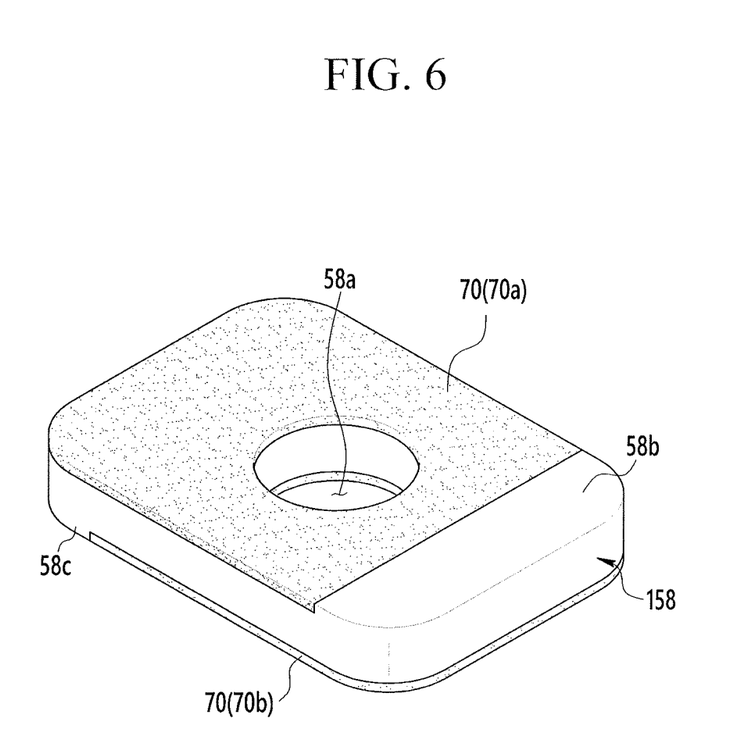
FIG. 6 illustrates another embodiment of a connection member in a cap plate.
Figure 7:
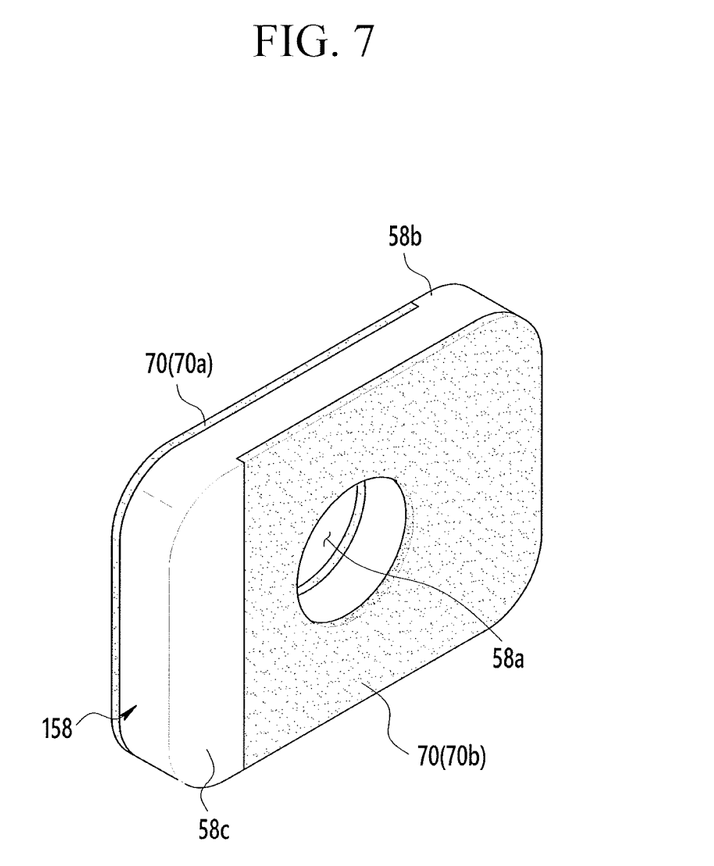
FIG. 7 illustrates another view of the connection member in FIG. 6.
Figure 8:
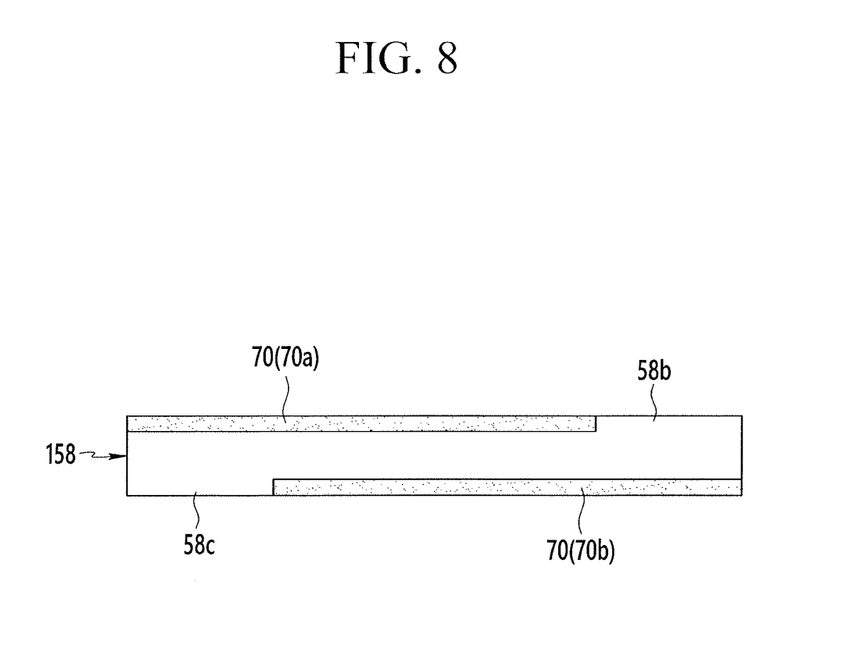
FIG. 8 illustrates another view of the connection member in FIG. 6.

FIG. 6 illustrates another embodiment of a connection member 158 in a cap plate of a rechargeable battery. FIG. 7 is a perspective view of the connection member 158 in FIG. 6 from a lower direction. FIG. 8 is a lateral view of the connection member 158 in FIG. 6.

Referring to FIG. 6 to FIG. 8, the connection member 158 includes a first extension portion 58b and a second extension portion 58c. The first extension portion 58b extends from the first exposed surface U1 in the upper direction. The second extension portion 58c extends from the second exposed surface U2 in the lower direction. The thickness of the first extension portion 58b may be the same as the thickness of the first insulating layer 70a. Also, the thickness of the second extension portion 58c may be the same as the thickness of the second insulating layer 70b.

Accordingly, the top surface of the first extension portion 58b is positioned on the same surface as the top surface of the first insulating layer 70a, and the bottom surface of the second extension portion 58c is positioned on the same surface as the bottom surface of the second insulating layer 70b. Thus, the connection member 58 may be interposed between the first terminal 21 (referring to FIG. 2) and the cap plate 31 (referring to FIG. 2) without separation.

Figure 9:
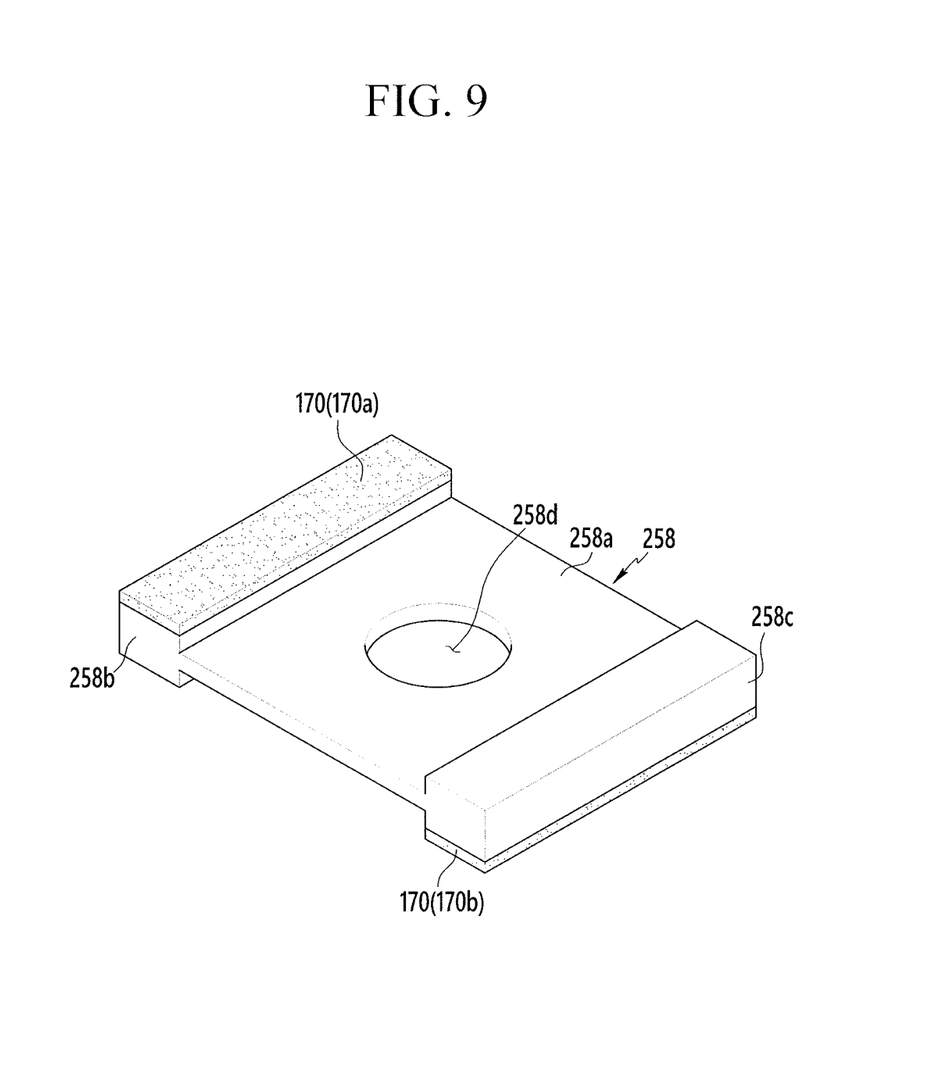
FIG. 9 illustrates another embodiment of a connection member in a cap plate.
Figure 10:
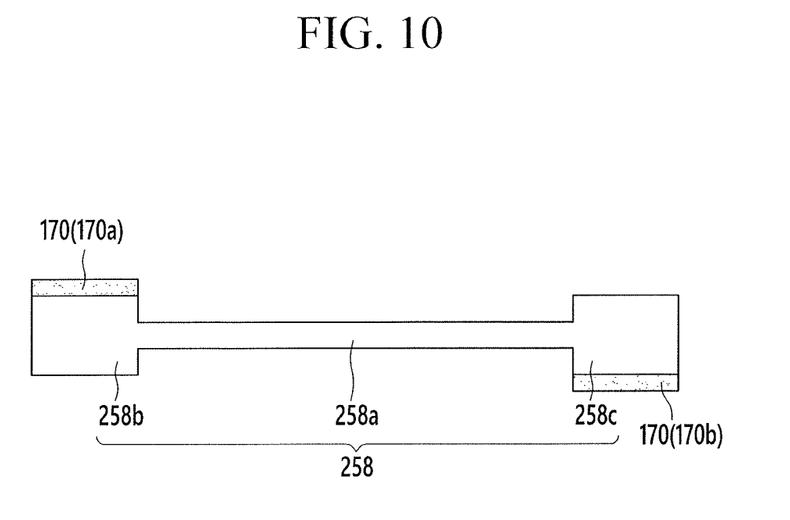
FIG. 10 illustrates another view of the connection member in FIG. 9.

FIG. 9 illustrates another embodiment of a connection member 258 in a cap plate of a rechargeable battery. FIG. 10 is a lateral view of the connection member 258 in FIG. 9.

Referring to FIGS. 9 and 10, the connection member 258 includes a body portion 258a, a third extension portion 258b, and a fourth extension portion 258c. The body portion 258a includes a through-hole 258d passing through the first terminal 21 (referring to FIG. 11) positioned between the first terminal 21 (referring to FIG. 2) and the cap plate 31 (referring to FIG. 2). The third extension portion 258b extends from the top and bottom surfaces of the left edge of the body portion 258a. The fourth extension portion 258c extends from the top and bottom surfaces of the right edge of the body portion 258a.

The cap assembly 31 (referring to FIG. 2) of this structure may include an insulating member 170. The insulating member 170 may include a third insulating layer 170a and a fourth insulating layer 170b. The third insulating layer 170a may include a non-conductive material formed in the top surface of the third extension portion 258b. The fourth insulating layer 170b is made of the non-conductive material and is formed in the bottom surface of the fourth extension portion 158c.

The connection member 258 may be manufactured, for example, using less of the third insulating layer 170a and the fourth insulating layer 170b than the connection member according to one or more of the previous embodiments. As a result, the connection member 258 may be less costly to manufacture. Also, the thickness of the body portion 258a of the connection member 258 may be thinner than the connection member according to one or more of the previous embodiments. As a result, the connection member may be comparatively lighter in weight and less costly to manufacture.

Figure 11:
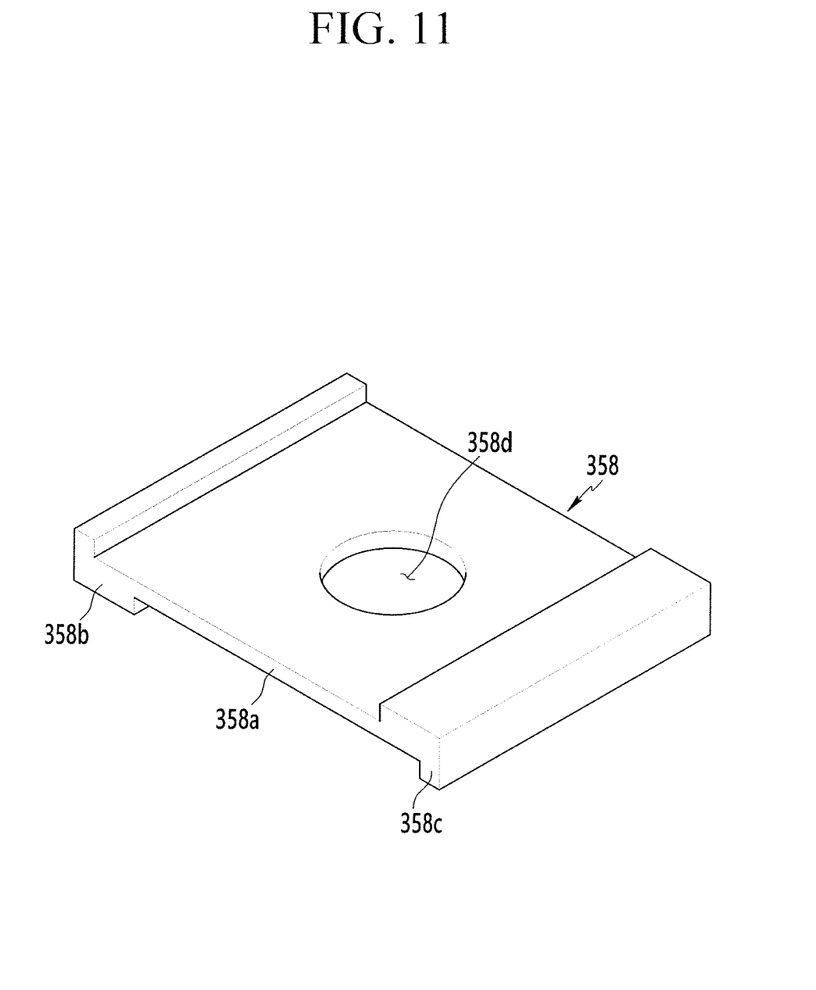
FIG. 11 illustrates another embodiment of a connection member in a cap plate.
Figure 12:
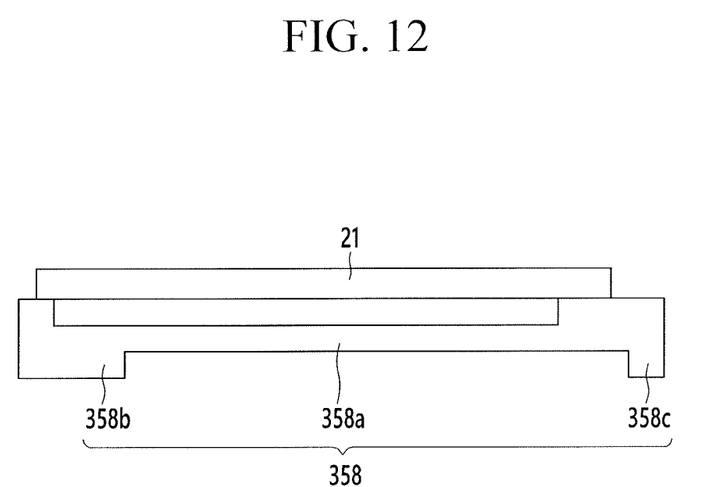
FIG. 12 illustrates an example of a state where a first terminal is positioned on the connection member in FIG. 11.

FIG. 11 illustrates another embodiment of a connection member 358 in a cap plate of a rechargeable battery. FIG. 12 is a lateral view showing a state where a first terminal is positioned on the connection member 358 in FIG. 11.

Referring to FIGS. 11 and 12, in the connection member 358, an upper side of a third extension portion 358b has a smaller right/left width than the lower side, and a lower side of a fourth extension portion 358c may have a smaller right/left width than the upper side. The cap assembly of this structure does not include the insulating member 170 (referring to FIG. 9) compared with the connection member 258 (referring to FIG. 9). As a result, the manufacturing process may be simplified and manufacturing costs may be reduced.

Example embodiments have been disclosed herein, and although specific terms are employed, they are used and are to be interpreted in a generic and descriptive sense only and not for purpose of limitation. In some instances, as would be apparent to one of skill in the art as of the filing of the present application, features, characteristics, and/or elements described in connection with a particular embodiment may be used singly or in combination with features, characteristics, and/or elements described in connection with other embodiments unless otherwise indicated. Accordingly, it will be understood by those of skill in the art that various changes in form and details may be made without departing from the spirit and scope of the invention as set forth in the following claims.

What is claimed is:

1. A rechargeable battery, comprising:
a case;
an electrode assembly in the case and including a first electrode and a second electrode; and
a cap assembly including:
a cap plate covering an opening of the case;
a first terminal protruding from the cap plate and electrically connected to the first electrode;
a connector including a conductive material and a through-hole for the first terminal, the connector between the first terminal and the cap plate; and
an insulator including a non-conductive material, the insulator overlapping a first area of a top surface of the connector and a first area of a bottom surface of the connector and not overlapping a second area of the top surface of the connector and a second area of the bottom surface of the connector.

2. The rechargeable battery as claimed in claim 1, wherein the insulator includes:
a first insulating layer overlapping the first area of the top surface of the connector, and
a second insulating layer overlapping the first area of the bottom surface of the connector.

3. The rechargeable battery as claimed in claim 2, wherein the second areas of the top and bottom surface of the connector do not overlap one another.

4. The rechargeable battery as claimed in claim 3, wherein the second areas of the top and bottom surfaces of the connector are located at respective ends of the connector.

5. The rechargeable battery as claimed in claim 3, wherein the connector includes:
a first extension portion extending from the second area of the top surface of the connector, and
a second extension portion extending from the second area of the bottom surface of the connector.

6. The rechargeable battery as claimed in claim 5, wherein:
the first extension portion has a thickness equal to a thickness of the first insulating layer, and
the second extension portion has a thickness equal to a thickness of the second insulating layer.

7. The rechargeable battery as claimed in claim 1, wherein the conductive material includes aluminum or an alloy of aluminum.

8. The rechargeable battery as claimed in claim 1, wherein the non-conductive material includes a non-conductive polymer.

9. A rechargeable battery, comprising:
a case;
an electrode assembly in the case and including a first electrode and a second electrode; and
a cap assembly including:
a cap plate covering an opening of the case;
a first terminal protruding from the cap plate and electrically connected to the first electrode, and
a connector including a conductive material, a through-hole for the first terminal, a body between the first terminal and the cap plate, first extension portions respectively extending from top and bottom surfaces at a first edge of the body, and second extension portions respectively extending from the top and bottom surfaces at a second edge of the body.

10. The rechargeable battery as claimed in claim 9, further comprising:
a first insulating layer overlapping a top surface of one of the first extension portions, and
a second insulating layer overlapping a bottom surface of one of the second extension portions.

11. The rechargeable battery as claimed in claim 10, wherein each of the first and second insulating layers include a non-conductive polymer.

12. The rechargeable battery as claimed in claim 9, wherein:
an upper side of one or more of the first extension portions has a smaller width than that of a lower side of the one or more of the first extension portions, and
a lower side of one or more of the second extension portions has a smaller width than that of an upper side of the one or more of the second extension portions.

13. The rechargeable battery as claimed in claim 9, wherein the conductive material includes aluminum or an alloy of aluminum.

14. An apparatus for a rechargeable battery, comprising:
a connector having a first surface, a second surface, and a terminal hole;
a first insulation layer overlapping a first area of the first surface; and
a second insulation layer overlapping a first area of the second surface, wherein the first insulation layer does not overlap a second area of the first surface and the second insulation layer does not overlap a second area of the second surface, and wherein the second areas of the first and second surfaces do not overlap.

15. The apparatus as claimed in claim 14, wherein:
the first surface is flat; and
the second surface is flat.

16. The apparatus as claimed in claim 14, wherein:
the first insulation layer overlaps an edge of the first surface,
the second insulation layer overlaps an edge of the second surface, and
the edge of the first surface opposes the edge of the second surface.

17. The apparatus as claimed in claim 14, wherein:
the first surface is uneven, and
the second surface is uneven.

18. The apparatus as claimed in claim 17, wherein:
a top surface of the first insulation layer is even with a top surface of the second area of the first surface, and
a top surface of the second insulation layer is even with a top surface of the second area of the second surface.

* * * * *